United States Patent
Ma et al.

(10) Patent No.: US 10,157,508 B2
(45) Date of Patent: Dec. 18, 2018

(54) METHOD AND DEVICE FOR INTELLIGENT ALERT ON VEHICLE RESTRICTION AND STORAGE MEDIUM

(71) Applicant: Xiaomi Inc., Beijing (CN)

(72) Inventors: Sen Ma, Beijing (CN); Ming Liu, Beijing (CN); Chao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 241 days.

(21) Appl. No.: 15/205,814

(22) Filed: Jul. 8, 2016

(65) Prior Publication Data
US 2017/0032588 A1    Feb. 2, 2017

(30) Foreign Application Priority Data

Jul. 31, 2015 (CN) .......................... 2015 1 0463637

(51) Int. Cl.
*G07C 5/00* (2006.01)
*G08G 1/0962* (2006.01)
(Continued)

(52) U.S. Cl.
CPC .............. *G07C 5/008* (2013.01); *B60W 40/00* (2013.01); *G06F 17/30979* (2013.01);
(Continued)

(58) Field of Classification Search
CPC ...... H04L 67/26; G07C 5/008; G08G 1/0962; G08G 1/20
See application file for complete search history.

(56) References Cited

U.S. PATENT DOCUMENTS

| 6,225,890 B1* | 5/2001 | Murphy | ................ B60R 25/012 |
| | | | 307/10.5 |
| 2005/0165547 A1* | 7/2005 | Uotani | ................ G01C 21/3461 |
| | | | 701/411 |

(Continued)

FOREIGN PATENT DOCUMENTS

| CN | 101593427 A | 12/2009 |
| CN | 202584370 U | 12/2012 |

(Continued)

OTHER PUBLICATIONS

International Search Report corresponding to PCT/CN2015/097663, dated Apr. 28, 2016, (13p).

(Continued)

*Primary Examiner* — June Y Sison
*Assistant Examiner* — Steven C Nguyen
(74) *Attorney, Agent, or Firm* — Brinks, Gilson & Lione

(57) ABSTRACT

The disclosure provides method and device for providing alert information on a vehicle and storage medium. The method includes analyzing user behavior data of a certain period of time in association with a user terminal to obtain vehicle restriction dates during the certain period of time, determining a vehicle restriction pattern based on the vehicle restriction dates, determining a new vehicle restriction date based on the vehicle restriction pattern, and providing the alert information on the vehicle to the user terminal based on the new vehicle restriction date. In the disclosure, a user terminal analyzes user behavior data automatically and acquires a user restriction pattern, and derives a vehicle restriction date according to the user restriction pattern and intelligently alerts the user to vehicle restriction when the above vehicle restriction date is upcoming.

19 Claims, 11 Drawing Sheets

(51) Int. Cl.
  *G08G 1/00* (2006.01)
  *G08G 1/09* (2006.01)
  *H04M 1/725* (2006.01)
  *H04L 29/08* (2006.01)
  *G06F 17/30* (2006.01)
  *B60W 40/00* (2006.01)
  *H04W 4/00* (2018.01)
  *H04W 4/04* (2009.01)

(52) U.S. Cl.
  CPC ............ *G08G 1/09* (2013.01); *G08G 1/0962* (2013.01); *G08G 1/20* (2013.01); *H04L 67/26* (2013.01); *H04M 1/72527* (2013.01); *H04W 4/00* (2013.01); *H04W 4/046* (2013.01)

(56) References Cited

U.S. PATENT DOCUMENTS

| | | | | |
|---|---|---|---|---|
| 2009/0240647 | A1* | 9/2009 | Green | G06N 7/005 706/52 |
| 2011/0137489 | A1* | 6/2011 | Gilleland | B60R 25/24 701/2 |
| 2014/0025225 | A1 | 1/2014 | Armitage et al. | |
| 2014/0038546 | A1* | 2/2014 | Neal | G06Q 10/103 455/405 |
| 2014/0303886 | A1* | 10/2014 | Roemersperger | G01C 21/3461 701/411 |
| 2015/0149020 | A1* | 5/2015 | Smith | B60W 40/09 701/23 |
| 2015/0149023 | A1 | 5/2015 | Attard et al. | |
| 2015/0169311 | A1* | 6/2015 | Dickerson | G06F 8/65 717/170 |
| 2016/0097648 | A1* | 4/2016 | Hannah | G06K 9/00785 701/118 |

FOREIGN PATENT DOCUMENTS

| | | | |
|---|---|---|---|
| CN | 102991415 | A * | 3/2013 |
| CN | 103000038 | A | 3/2013 |
| CN | 203179297 | U | 9/2013 |
| CN | 103383818 | A | 11/2013 |
| CN | 103606292 | A | 2/2014 |
| CN | 103712630 | A | 4/2014 |
| CN | 104331953 | A | 2/2015 |
| CN | 104346942 | A | 2/2015 |
| CN | 105138584 | A | 12/2015 |
| JP | 2009-281960 | A | 12/2009 |
| JP | 2010-250724 | A | 11/2010 |
| KR | 10-0835603 | B1 | 6/2008 |

OTHER PUBLICATIONS

Extended European Search Report dated Jan. 5, 2017 European Application No. 16179333.6, 9 pages.
Office Action dated Feb. 15, 2017 Korean Application No. 10-2016-7003955, 10 pages.
Office Action dated Oct. 3, 2017 for Japanese Application No. 2017-531944, 4 pages.
Office Action dated Jan. 17, 2018 for Chinese Application No. 201510463637.9, 8 pages.

\* cited by examiner

METHOD AND DEVICE FOR INTELLIGENT ALERT ON VEHICLE RESTRICTION AND STORAGE MEDIUM

CROSS-REFERENCE TO RELATED APPLICATIONS

This application claims priority of the Chinese Patent Application No. 201510463637.9 filed on Jul. 31, 2015, which is incorporated by reference in its entirety.

TECHNICAL FIELD

The present disclosure generally relates to the field of communication technology, and more particularly, to methods and devices for providing intelligent alerts on vehicle restrictions.

BACKGROUND

With an improved standard of living, vehicles have increasingly become a necessary tool of transportation for daily travel. Meanwhile, a sharp rise in the number of vehicles is placing a heavy traffic pressure on roads. In order to reduce the impact of traffic jams on people's life, at least one traffic administrative department has adopted a vehicle usage restriction measure based on license plate number to ease traffic pressure.

Due to the above restriction measure by license plate number, a vehicle user will typically query restriction traffic administrative regulations according to his/her license plate number in advance, determine whether his/her vehicle is restricted on the travelling day, and decide whether to drive or not. However, in related arts, queries of vehicle restriction need manual operation. That is to say, once a user forgets to query restriction traffic administrative regulations on a vehicle restriction day and drives out, he/she will face a troublesome traffic violation penalty. After several such violations, a more severe result may arise such as suspension of the user's driving license, which may seriously affect the user's work and life.

SUMMARY

In view of the above, the present disclosure provides a method and a device for intelligent alert on vehicle restriction, so as to address the risk of driving on a vehicle restriction day due to a user forgetting to query a vehicle restriction date, which violates restriction traffic administrative regulations in related arts.

In a first aspect of the present disclosure, a method for providing intelligent alerts on vehicle restriction is provided. The method includes analyzing user behavior data of a certain period of time in association with a user terminal to obtain vehicle restriction dates during the certain period of time, determining a new vehicle restriction date based on the vehicle restriction pattern, and providing the alert information on the vehicle to the user terminal based on the new vehicle restriction date.

In one embodiment, analyzing user behavior data of the certain period of time to obtain vehicle restriction dates comprises dividing the user behavior data into N user behavior data units corresponding to N cycles included in the certain period of time, and determining a vehicle restriction date for each of the N cycles based on each of the N user behavior data units.

In other embodiment, determining a vehicle restriction date for each of the N cycles based on each of the N user behavior data units includes extracting a user terminal usage parameter for a workday in the each cycle from the user behavior data units; and determining a vehicle restriction day based on comparison of user terminal usage parameters for workdays in the each cycle.

In other embodiment, the user terminal usage parameter includes a terminal operation frequency during a certain time of the workday.

In other embodiment, the user terminal usage parameter includes a length of time that the user terminal is connected with the vehicle via wireless communication link during a certain time of the workday.

In other embodiment, each of the N cycles is one week.

In other embodiment, the terminal operation frequency comprises a number of a screen of the user terminal being turned on.

In other embodiment, terminal operation frequency comprises a number of access requests made to the internet by the user terminal.

In other embodiment, the user terminal usage parameter comprises a number of text messages sent during a certain time of the workday.

In other embodiment, providing the alert information on vehicle restriction to the user terminal based on the new vehicle restriction date includes displaying the alert information on the user terminal when the user terminal is connected with the vehicle on the new vehicle restriction date.

In other embodiment, providing the alert information on the vehicle to the user terminal based on the new vehicle restriction date includes displaying a message requesting confirmation of a last digit of a the license plate number for the vehicle.

In other embodiment, providing the alert information on the vehicle to the user terminal based on the new vehicle restriction date includes providing the alert information on the vehicle via text, picture, voice or video.

In a second aspect of the present disclosure, a device for providing an intelligent alert on vehicle restriction is provided. The device includes a restriction pattern acquiring module configured to analyze user behavior data of a user terminal and acquire a user restriction pattern, a restriction date deriving module configured to derive a vehicle restriction date according to the user restriction pattern, an alerting module configured to alert a user to vehicle restriction based on the vehicle restriction date.

In other embodiment, the restriction pattern acquiring module includes a first data acquiring sub-module configured to acquire user behavior data for a preset period of time, the preset period of time including N restriction cycles, a data dividing sub-module configured to divide, based on the restriction cycles, the user behavior data into N user behavior data units, in each of which, user terminal usage parameters for a same time period on every workday in one restriction cycle are recorded, a first data analyzing sub-module configured to analyze the user behavior data unit and acquire a user restriction day in each restriction cycle, a first data statistics sub-module configured to statistically analyze user restriction days of the N restriction cycles to acquire a first user restriction pattern.

In other embodiment, the first data analyzing sub-module is configured to use a workday for which a user terminal usage parameter is different from user terminal usage parameters for other workdays in the user behavior data unit as a user restriction day.

In other embodiment, the first data statistics sub-module includes a first statistics sub-module configured to make statistics on the N restriction cycles for the preset period of time and acquire a user restriction day corresponding to each restriction cycle, a second statistics sub-module configured to statistically analyze the user restriction day corresponding to each restriction cycle for the preset period of time and acquire the first user restriction pattern, the first user restriction pattern including a recent restriction alternating date of the user, a restriction day of the user in the current restriction cycle, and a restriction alternating cycle.

In other embodiment, the restriction date deriving module includes a calculating sub-module configured to add one restriction alternating cycle to the recent restriction alternating date of the user, and acquire a next restriction alternating date of the user, a first deriving sub-module configured to, when the time interval between the user's current date and the user's next restriction alternating date is equal to or larger than one restriction cycle, use a restriction day of the user in the current restriction cycle as a restriction day in the next restriction cycle; a second deriving sub-module configured to, when the time interval between the user's current date and the user's next restriction alternating date is smaller than one restriction cycle, postpone a restriction day of the user in the current restriction cycle by one day and acquire a restriction day in the next restriction cycle.

In other embodiment, each restriction cycle is one week.

In other embodiment, the user terminal usage parameter is a user terminal usage frequency, and further, the first data analyzing sub-module is configured to use a workday for which a user terminal usage frequency is higher than user terminal usage frequencies for other workdays in the user behavior data unit as a user restriction day.

In other embodiment, the user terminal usage parameter is the length of time that the user terminal is connected with a target vehicle Bluetooth, and further, the first data analyzing sub-module is configured to use a workday for which the length of time that the user terminal is connected with a target vehicle Bluetooth is zero or significantly smaller than the lengths of time that the user terminal is connected with a target vehicle Bluetooth for other workdays in the user behavior data unit as a user restriction day.

In other embodiment, the restriction pattern acquiring module includes a second data acquiring sub-module configured to acquire user behavior data for a preset period of time, a second data analyzing sub-module configured to analyze the user behavior data and acquire a second user restriction pattern, the second user restriction pattern including a restriction cycle, and a user restriction day in each restriction cycle.

In other embodiment, the restriction date deriving module includes a restriction table acquiring sub-module configured to acquire a restriction traffic administrative information table of a place where the user behavior occurs, the restriction traffic administrative information table including correspondence between license plate number information and a restriction day, a license plate number information acquiring sub-module configured to query the restriction traffic administrative information table according to the user restriction day and acquire license plate number information of the user's vehicle, a restriction date querying sub-module configured to query the restriction traffic administrative information table according to the license plate number information and acquire the vehicle restriction date.

In other embodiment, the restriction date deriving module further includes a confirmation information prompting sub-module configured to issue prompt information to request confirmation of the license plate number information, a feedback information receiving sub-module configured to provide a user operation entrance in a user interface and receive feedback information of the user on the prompt information.

In other embodiment, the way in which the feedback information receiving sub-module provides the user operation entrance in the user interface includes: providing the user operation entrance by displaying an operational button in the user interface of the user terminal, or providing the user operation entrance by prompting a voice input in the user interface of the user terminal.

In other embodiment, the alerting module is configured to make an alert on vehicle restriction via text, picture, voice or video.

In a third aspect of the present disclosure, a user terminal is provided which includes a processor and a memory storing instructions executable by the processor. The processor is configured to analyze user behavior data of a certain period of time in association with a user terminal to obtain vehicle restriction dates during the certain period of time, determine a vehicle restriction pattern based on the vehicle restriction dates, determine a new vehicle restriction date based on the vehicle restriction pattern, and provide the alert information on the vehicle to the user terminal based on the new vehicle restriction date.

In a fourth aspect of the present disclosure, a storage medium is provided, the recording medium being readable by a computer and having recorded thereon a computer program including instructions for executing the steps of a method for providing an intelligent alert on vehicle restriction according to the first aspect of the present disclosure.

It is to be understood that both the forgoing general descriptions and the following detailed descriptions are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
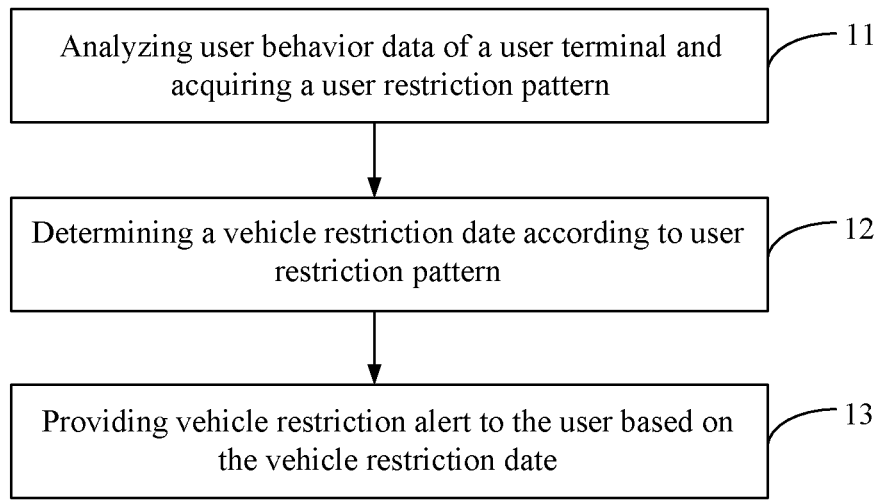
FIG. 1 is a flow chart showing a method for intelligent alert on vehicle restriction, according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

As used in the present disclosure, terms are merely for purpose of describing specific embodiments and are not intended to limit the disclosure. "a", "said" and "the" in singular form as used in the present disclosure and appended claim set are intended to also include their plural forms, unless other meanings are clearly represented in context. It should also be understood that, term "and/or" used herein refers to and includes any or all possible combinations of one or more associated items as listed.

As should be understood, although the present disclosure may utilize terms "first", "second", "third" and the like to describe various information, this information is not limited to such terms. Such terms merely serve to distinguish information of the same type from each other. For example, without departing from the scope of the present disclosure, first information may also be called second information, and similarly, second information may also be called first information. Dependent on context, word "if" as used herein may be interpreted as "when" or "upon" or "in response to determination".

In a scenario of the present disclosure, user A regularly travels by driving. Normally, user A drives for certain periods of time, such as commuting time every workday. In order to alleviate traffic pressure caused by motor vehicles and reduce impact of vehicle exhaust on environment, a traffic administrative department which has jurisdiction over user A may issue a use restriction measure, specifying that: within one restriction cycle, vehicles with different license plate number information are restricted once on designated dates. For example, within one week, a vehicle with a license plate number ending with a certain number is restricted on a certain workday. Accordingly, the user A's vehicle will be restricted on a certain day within one restriction cycle. The restriction may prohibit any driving of the vehicle on the certain workday, prohibit driving of the vehicle during particular hours or in particular regions during the certain workday, or be any of a number of driving prohibitions.

User A's behaviors in operating a user terminal such as a phone are quite different when driving and not. Based on that characteristic, embodiments of the present disclosure provide a method for intelligent alert on vehicle restriction. A user terminal such as phone, tablet, PAD, etc. which implements such a method is provided with a device for intelligent alert on vehicle restriction, which device may be an application software, such as an APP named "travel assistant", installed on a smart device, which may analyze a user's travel rule based on user behavior data acquired so as to derive a restriction date of the user's vehicle, and intelligently alert the user to vehicle restriction at a preset time point, such as a preset time in the morning of the restriction date or in the evening of one day before the restriction date, so that the user can make a travel plan in advance.

As shown in FIG. 1, which is a flow chart showing a method for providing an intelligent alert on vehicle restriction according to an exemplary embodiment, the method may be used in a user terminal and includes the following steps.

In step 11, user behavior data of a user terminal is analyzed and a user restriction pattern is acquired. The user behavior data may include a pattern of using the terminal. For example, the user behavior data may include a certain date and time of operating the terminal. Step 11 may include the following two implementations.

Figure 2:
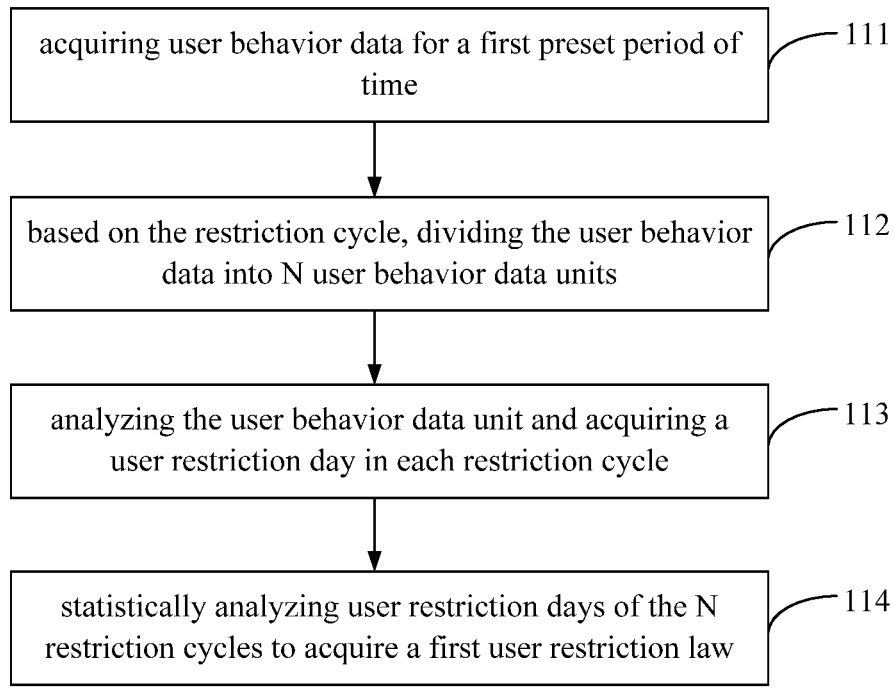
FIG. 2 is a flow chart showing a method for intelligent alert on vehicle restriction, according to an exemplary embodiment of the present disclosure.

Implementation 1. Referring to FIG. 2 which is a flow chart showing a method for providing an intelligent alert on vehicle restriction according to an exemplary embodiment, the above step 11 may include the following steps.

In step 111, user behavior data for a first preset period of time is acquired. The first preset period of time may include N restriction cycles. The value of N should satisfy the following condition: restriction days within N restriction cycles include at least user's all regular restriction days. The above first preset period of time may also be a period of time including N restriction cycles counted back by a user terminal from the current date.

In one embodiment, the user behavior data for the first preset period of time may be stored in a storage unit local to the user terminal. Alternatively, the user behavior data may be stored in a remote server corresponding to the user terminal. For the latter case, the user terminal receives user behavior data for the preset period of time from the remote server, and storage resource of the user terminal may be saved.

Assuming that the user behavior data for the first preset period of time records user behavior data of the user terminal for 16 consecutive weeks beginning from a certain time, such as user behavior data from the first week beginning on Apr. 13, 2015 till the sixteenth week. Assuming that a restriction policy currently implemented is: vehicle with a different last digit of a license plate number is restricted on a different workday among the five workdays of one week, and not restricted on Saturday and Sunday. The above restriction cycle is one week, so the above 16 weeks includes user behavior data in 16 restriction cycles.

In step 112, based on the restriction cycles, the user behavior data is divided into N user behavior data units, in each of which, user terminal usage parameters for a same time period on every workday in one restriction cycle are recorded.

As described above, the user behavior data in 16 restriction cycles may be divided into 16 user behavior data units on a weekly basis. That is, the above restriction cycle is one week. For each user behavior data unit, user terminal usage parameters for a period of 8:00 am through 9:00 am on Monday till Friday of a week are recorded. The user terminal usage parameter may include a user terminal usage frequency such as the frequency at which a user operates a phone via a touch screen. The user terminal usage parameter may also include the length of time that the user terminal is in connection with a target vehicle Bluetooth.

In step 113, the user behavior data unit is analyzed and a user restriction day in each restriction cycle is acquired.

Taking the analysis of a usage frequency at which the user operates the user terminal for a period of 8:00~9:00 on every workday of a week as an example, the usage frequency of the user terminal when user A is driving is significantly lower than the usage frequency of the user terminal for the same time period when user A is not driving. Specifically, if the user terminal is, for example, a phone, the frequency at which the phone is operated by user A while user A is not driving is significantly higher than that while user A is driving. Therefore, a workday on which a user terminal usage frequency is higher than user terminal usage frequencies on other workdays in the user behavior data unit may be determined to be a user restriction day.

In other embodiment, if a user terminal usage frequency for a predetermined period of time on a certain weekday is higher than a predetermined threshold, then that certain weekday is determined to be a user restriction day. For example, if a user turns on the display of his smart phone ten times during a period of 8 a.m. through 9 a.m. on Tuesday, which is higher than a predetermined threshold value of five times, then that Tuesday is determined to be a user restriction day. In other example, if a user accesses to the internet eight times through Wi-Fi, 3G, 4G or any other wireless connection on Wednesday, which is higher than a predetermined threshold value of three times, then that Wednesday is considered as a user restriction day. In another example, if the number of text messages sent out during a period of 8 a.m. through 9 a.m. on Friday is ten, which is higher than a predetermined threshold value of one, then that Friday is determined to be a user restriction day.

The predetermined period of time on a certain weekday can be set based on driving time by a user. For example, if a user is driving a vehicle carrying his smart phone between 8:00 a.m. and 8:30 a.m., the predetermined period of time can be set as 8:00 through 8:30 by referring to, for example, a time period of Bluetooth connection between the vehicle and the smart phone.

For example, by comparing the frequencies at which the user operates the phone for a period of 8:00~9:00 every day from Monday to Friday in one week, it is found that the frequency at which the user operates the phone for a period of 8:00~9:00 on Tuesday is significantly higher than the frequency at which the user operates the phone for a period of 8:00~9:00 on other workdays. This may be interpreted that the user is not driving on Tuesday. Therefore, Tuesday may be determined to be a restriction day for the vehicle belonging to user A. That is, it may be determined that user A is not allowed to drive on Tuesday.

When the user terminal usage parameter is the length of time that the user terminal is connected with a target vehicle Bluetooth or other wireless communication link, the determining procedure is similar as above. During a certain time period of a user restriction day such as 8:00~9:00, the length of time that the user terminal is in connection with a target vehicle Bluetooth on the user restriction day is zero or significantly smaller than the length of time that the user terminal is in connection to a target vehicle Bluetooth in 8:00~9:00 on other workdays, such as significantly smaller than a preset threshold. Since each vehicle has a different identifier of a vehicle Bluetooth device, based on the length of time that the user terminal is in connection with a target vehicle Bluetooth, it can be determined whether the user is operating the target vehicle.

In step 114, user restriction days of the N restriction cycles are statistically analyzed to acquire a first user restriction pattern.

Figure 3:
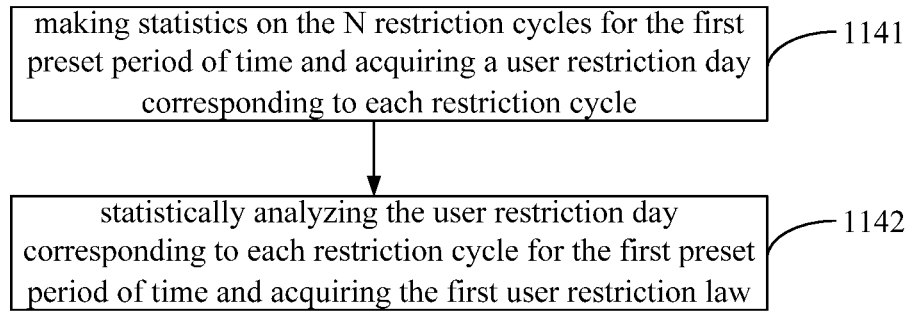
FIG. 3 is a flow chart showing a method for intelligent alert on vehicle restriction, according to an exemplary embodiment of the present disclosure.

FIG. 3 is a flow chart showing a method for providing an intelligent alert on vehicle restriction according to an exemplary embodiment, and the above step 114 may include the following steps.

In step 1141, statistics are prepared on the N restriction cycles for the first preset period of time and a user restriction day corresponding to each restriction cycle is acquired.

As above, in embodiments of the present disclosure, assuming that N is equal to 16. After step 113, the user terminal may acquire 16 user restriction days. If one cycle number is assigned to each user behavior unit, a data list will be acquired after step 113, which may include: correspondence between a cycle number, corresponding specific dates and a user restriction day, as shown in Table 1.

TABLE 1

| Cycle number | Corresponding dates | User restriction day |
|---|---|---|
| 1 | Apr. 13, 2015 till Apr. 17, 2015 | Monday |
| 2 | Apr. 20, 2015 till Apr. 24, 2015 | Monday |
| 3 | Apr. 27, 2015 till May 1, 2015 | Monday |
| 4 | May 4, 2015 till May 8, 2015 | Tuesday |
| 5 | May 11, 2015 till May 15, 2015 | Tuesday |
| 6 | May 18, 2015 till May 22, 2015 | Tuesday |
| 7 | May 25, 2015 till May 29, 2015 | Wednesday |
| 8 | Jun. 1, 2015 till Jun. 5, 2015 | Wednesday |
| 9 | Jun. 8, 2015 till Jun. 12, 2015 | Wednesday |
| 10 | Jun. 15, 2015 till Jun. 19, 2015 | Thursday |
| 11 | Jun. 22, 2015 till Jun. 26, 2015 | Thursday |
| 12 | Jun. 29, 2015 till Jul. 3, 2015 | Thursday |
| 13 | Jul. 6, 2015 till Jul. 10, 2015 | Friday |
| 14 | Jul. 13, 2015 till Jul. 17, 2015 | Friday |
| 15 | Jul. 20, 2015 till Jul. 24, 2015 | Friday |
| 16 | Jul. 27, 2015 till Jul. 31, 2015 | Monday |

As known from Table 1, user restriction days corresponding to the 16 restriction cycles include at least the user's all regular restriction days, which may include: Monday, Tuesday, Wednesday, Thursday, Friday.

In step 1142, the user restriction day corresponding to each restriction cycle for the first preset period of time is statistically analyzed and the first user restriction pattern is acquired. The first user restriction pattern includes a recent restriction date of the user, a restriction day of the user in the current restriction cycle, and a restriction changing cycle.

The restriction day of user A in each week of the above 16 restriction cycles is statistically analyzed and the first user restriction pattern of user A is acquired. The first user restriction pattern may include the following information: the recent restriction date of user A is 2015 Jul. 27; the restriction day of user A in the current restriction cycle is Monday; and the restriction changing cycle is 3 weeks.

In embodiments of the present disclosure, the user terminal acquires the above first user restriction pattern by analyzing user behavior data for a first preset period of time. In subsequent process, the user terminal can determine a restriction date of the user's vehicle without the need of analyzing other data and the need for the user to input information, and alert the user regarding vehicle restriction based on the above vehicle restriction date, which prevents the user from driving on the vehicle restriction date.

Figure 4:
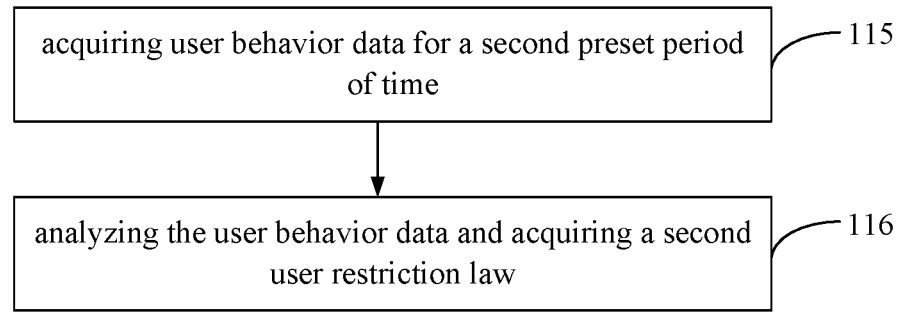
FIG. 4 is a flow chart showing a method for intelligent alert on vehicle restriction, according to an exemplary embodiment of the present disclosure.

Implementation 2. Referring to FIG. 4 which is a flow chart showing a method for providing an intelligent alert on vehicle restriction according to an exemplary embodiment, the above step 11 may include the following.

In step 115, user behavior data for a second preset period of time is acquired. The second preset period of time may include at least one restriction cycle. For example, user behavior data of user A for a time period from 2015 Jul. 12 to 2015 Jul. 28 is acquired.

In step 116, the user behavior data is analyzed and a second user restriction pattern is acquired, the second user restriction pattern including: a restriction cycle, and a user restriction day in each restriction cycle.

For example, the user behavior data in the morning rush hour of 8:00~9:00 of everyday within the above time period is analyzed, the result of which is: the time period from 2015 Jul. 13 to 2015 Jul. 26 includes 2 restriction cycles, each having a cycle length of 7 days, i.e., one week; the user restriction days within all restriction cycles are Monday. The above analysis result may be represented by the following Table 2.

TABLE 2

| Cycle number | Corresponding dates | User restriction day |
| --- | --- | --- |
| 1 | Jul. 13, 2015 till Jul. 17, 2015 | Monday |
| 2 | Jul. 20, 2015 till Jul. 24, 2015 | Monday |
| 3 | Jul. 27, 2015 till Jul. 27, 2015 | Monday |

According to the above analysis result, the second user restriction pattern is acquired, which may include: the restriction cycle is one week, and the user restriction day of user A is Monday in each week.

Compared with Implementation 1 of step 11, Implementation 2 of step 11 has a smaller data amount to calculate, which can improve calculation efficiency of the user terminal.

Figure 5:
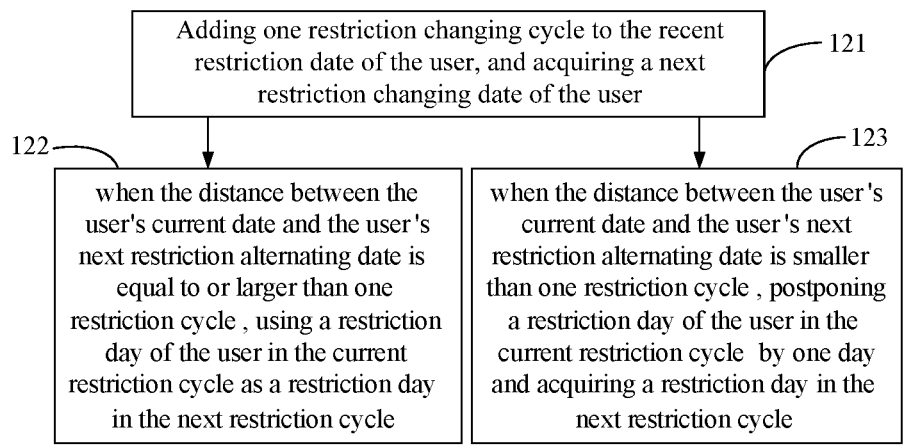
FIG. 5 is a flow chart showing a method for intelligent alert on vehicle restriction, according to an exemplary embodiment of the present disclosure.

In step 12, a vehicle restriction date is determined according to the above user restriction pattern. Corresponding to Implementation 1 of step 11, the above step 12 may include the following steps, referring to FIG. 5 which is a flow chart showing a method for intelligent alert on vehicle restriction according to an exemplary embodiment.

In step 121, one restriction changing cycle is added to the recent restriction date of the user, and a next restriction date of the user acquired. Combined with the above embodiment, counting three weeks from the recent restriction date 2015 Jul. 27, the next restriction date 2015 Jul. 17 of user A may be acquired. In other words, for the restriction cycle to which 2015 Jul. 17 belongs, the user restriction day of user A will be changed to Tuesday.

In step 122, when the time interval between the user's current date and the user's next restriction alternating date is equal to or larger than one restriction cycle, a restriction day of the user in the current restriction cycle is used as a restriction day in the next restriction cycle.

Assuming that the user's current date is 2015 Jul. 30, the time interval between the user's current date and the user's next restriction alternating date 2015 Aug. 17 is 18 days, which is larger than one restriction cycle, i.e., 7 days. Therefore, a restriction day of the user in the current restriction cycle, i.e., Monday is used as a restriction day in the next restriction cycle. That is, in the restriction cycle corresponding to 2015 Aug. 3 till 2015 Aug. 7, Monday is used as a restriction day in the restriction cycle. In other words, 2015 Aug. 3 is determined to be the next restriction day of user A.

In step 123, when the time interval between the user's current date and the user's next restriction alternating date is smaller than one restriction cycle, a restriction day in the next restriction cycle is determined by pushing back a restriction day in the current restriction cycle by one day.

Assuming that the user's current date is 2015 Aug. 12, the time interval between the user's current date and the user's next restriction alternating date 2015 Aug. 17 is 5 days, which is smaller than one restriction cycle, i.e., 7 days. If a restriction day in the current restriction cycle is Monday, a restriction day in the next restriction cycle would be Tuesday by pushing back the restriction day in the current restriction cycle by one day. That is, in the restriction cycle corresponding to 2015 Aug. 17 till 2015 Aug. 21, Tuesday is determined to be a restriction day in the restriction cycle. User A will not be allowed to drive on 2015 Aug. 18.

Figure 6:
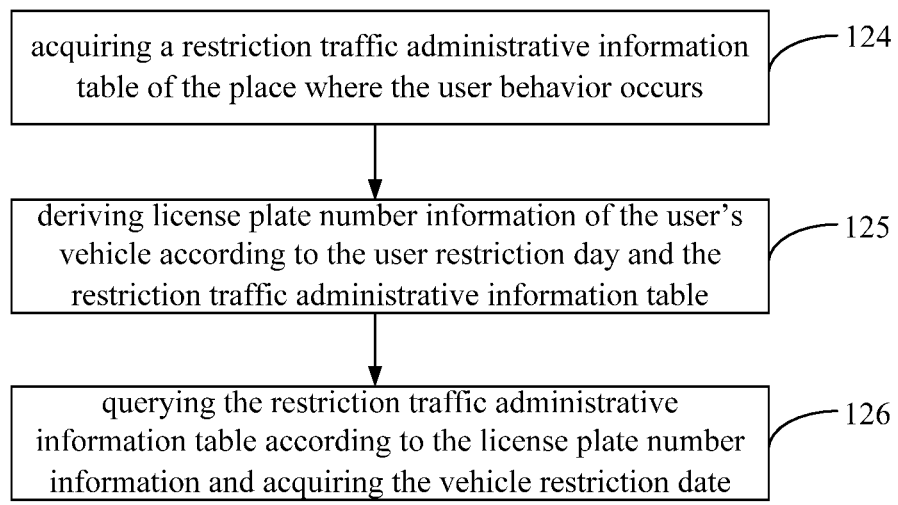
FIG. 6 is a flow chart showing a method for intelligent alert on vehicle restriction, according to an exemplary embodiment of the present disclosure.

Corresponding to Implementation 2 of step 11, the above step 12 may include the following steps, referring to FIG. 6 which is a flow chart showing a method for providing an intelligent alert on vehicle restriction according to an exemplary embodiment.

In step 124, a restriction traffic administrative information table of a place where the user behavior occurs is prepared. The restriction traffic administrative information table includes correspondence between license plate number information and a restriction day.

Recorded in the user behavior data is corresponding geographic location information, i.e., geographic location information on a place where the user behavior occurs. Based on the geographic location information, a restriction traffic administrative information table may be acquired from a cloud server, such as a server of the traffic administrative department. The traffic administrative information table may include correspondence between license plate number information and a restriction day.

Assuming that the license plate number information is the last digit of a license plate number, the above restriction traffic administrative information table may be represented in the form of Table 3 as below.

TABLE 3

| License plate number information | Last digits 1 and 6 stop running | Last digits 2 and 7 stop running | Last digits 3 and 8 stop running | Last digits 4 and 9 stop running | Last digits 5 and 0 stop running |
|---|---|---|---|---|---|
| Restriction day | Monday | Tuesday | Wednesday | Thursday | Friday |
| Restriction time | Jul. 12, 2015 till Oct. 10, 2015 | | | | |

In step 125, license plate number information of the user's vehicle is derived according to the user restriction day and the restriction traffic administrative information table.

According to the user restriction day Monday acquired in the above step 116, the restriction traffic administrative information table shown in Table 3 may be queried and the last digit of the license plate number of user A's vehicle may be determined as 1 or 6.

In step 126, the restriction traffic administrative information table is queried according to the license plate number information and the vehicle restriction date is acquired.

Assuming that the current date is 2015 Jul. 28, the user terminal may query the restriction traffic administrative information table and the restriction time in Table 3 based on the information on the last digit of the license plate number acquired and determine that: the next restriction date of user A is 2015 Aug. 3.

Further, if a user drives to another city currently, that is, the place where the user is currently located is different from the place where the above user behavior data occurs, the user terminal may also query the restriction traffic administrative information table of the place where the user is located based on the last digit of the license plate number acquired and acquire a vehicle restriction date of the user's vehicle in the place where the user is currently located.

Figure 7:
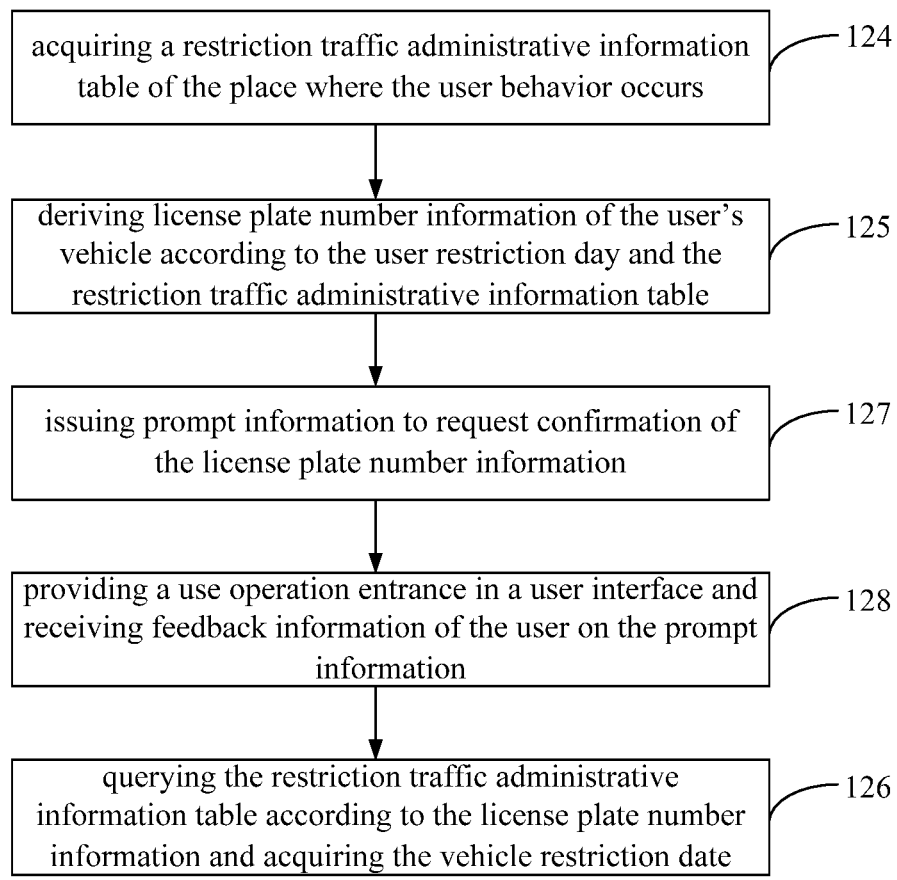
FIG. 7 is a flow chart showing a method for intelligent alert on vehicle restriction, according to an exemplary embodiment of the present disclosure.

In embodiments of the present disclosure, after a user terminal analyzes user behavior data and acquires a user restriction pattern, a restriction traffic administrative information table of the place where the user behavior occurs can be queried, license plate number information of the user's vehicle can be acquired accurately, and then, a restriction traffic administrative information table of the place where the user terminal is located can be queried according to the above license plate number information and a predicted restriction date of the user's vehicle can be acquired. The predicted restriction date may be a vehicle restriction date for the next time or vehicle restriction dates for the next few times Referring to FIG. 7, which is a flow chart showing a method for providing an intelligent alert on vehicle restriction according to an exemplary embodiment, based on the embodiment shown in FIG. 6, the following steps may further be included between step 125 and step 126.

In step 127, prompt information to request confirmation of the license plate number information is issued. For example, the user terminal presents prompt information stating "The last digit of your license plate number is 1 or 6, please confirm whether it is correct?" by displaying it on a user interface or by a voice prompt etc. As an example, referring to FIG. 8, which is a schematic diagram showing an application scenario for providing an intelligent alert on vehicle restriction according to an exemplary embodiment, prompt information "Is the last digit of your license plate number 1 or 6?" is displayed in the dialog box 20 on the user interface of an APP named "travel assistant" of the user terminal. As another example, referring to FIG. 9, which is a schematic diagram showing an application scenario for providing an intelligent alert on vehicle restriction according to an exemplary embodiment, voice prompt information "The last digit of your license plate number is 1 or 6, please confirm whether it is correct?" is issued via a voice player.

In step 128, a user input interface is provided on a user interface and feedback information of the user on the above prompt information is received.

Correspondingly, a user input interface for a user to input feedback information may be provided on the user interface, which may receive positive feedback information from the user in response to the above prompt information when the content of the prompt information is right and receive negative feedback information from the user in response to the above prompt information when the content of the prompt information is wrong.

The implementation of specific interaction between the user and the user terminal is associated with the implementation of the user input interface. The user input interface may be implemented in plural ways. Accordingly, interaction between the user and the user terminal may also be implemented in plural ways.

Figure 8:
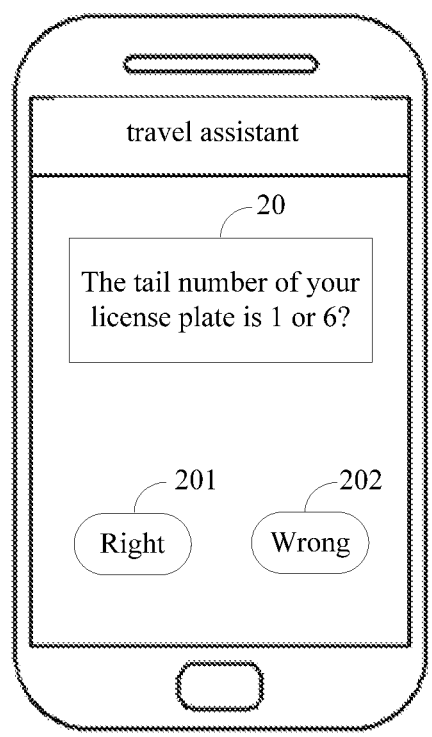
FIG. 8 is a schematic diagram showing an application scenario for intelligent alert on vehicle restriction, according to an exemplary embodiment of the present disclosure.

For example, a user input interface may be provided by displaying an operable button on the user interface of the user terminal. Currently, most phones are equipped with a touch screen. Therefore, a user input interface may be provided via an operable button etc. displayed on the user interface, and the user may input feedback information on the above prompt information by touching a corresponding button on the touch screen. The above button may be a "right" button 201 or a "wrong" button 202, as shown in FIG. 8.

Figure 9:
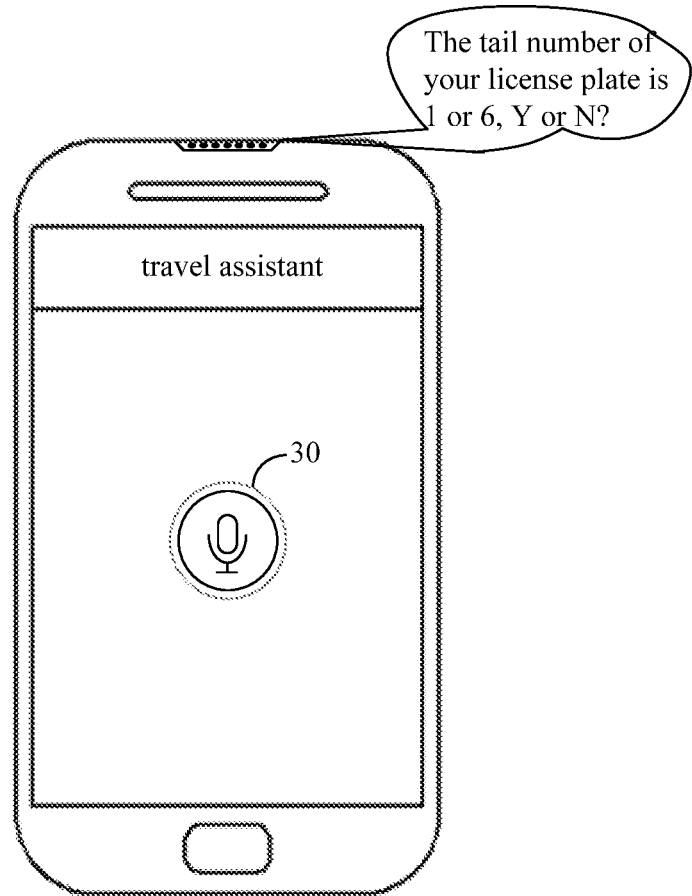
FIG. 9 is a schematic diagram showing another application scenario for intelligent alert on vehicle restriction, according to an exemplary embodiment of the present disclosure.

Alternatively, a user input interface may be provided by prompting a voice input on the user interface of the user terminal. A specific implementation may be a button for voice input 30 on the user interface of "travel assistant" which may be provided as a user operation entrance. After the user touches the button for voice input 30, a voice input device such as a microphone on the user terminal may be ready to receive a voice sound and voice information input from the user may be received. For example, the user may speak "right" or "wrong" etc. into the microphone of the user terminal. Accordingly, the "travel assistant" may recognize the voice input signal, as shown in FIG. 9.

In embodiments of the present disclosure, a step of confirming license plate number information acquired by the user terminal is added. Based on feedback information input by a user via a user input interface, accuracy of the license plate number information is further confirmed by the user, and in turn, accuracy of the vehicle restriction date acquired by the user terminal based on the license plate number information can be increased and user experience of the user terminal can be improved.

In step 13, vehicle restriction alert is provided to the user based on the above vehicle restriction date.

After acquiring a vehicle restriction date of a future time period, the user terminal may alert the user to vehicle restriction in advance before the user travels on the restriction day, for example at 7:00, or at a certain time one day before the restriction day. The user terminal may alert the user to vehicle restriction via text, picture, voice or video etc., and make sure that the user can receive alert information on vehicle restriction effectively so that the user can make a travel plan in advance.

As important to note, the user terminal involved in various embodiments of the present disclosure may be a wearable device, a smart phone, a personal digital assistant, etc. carried by the user, which is not limited by embodiments of the present disclosure. The cloud server involved in various embodiments of the present disclosure may be a server of the traffic administrative department, etc.

Corresponding to the above embodiments of application function realizing methods, the present disclosure also provide embodiments of application function realizing devices and corresponding terminals.

Figure 10:
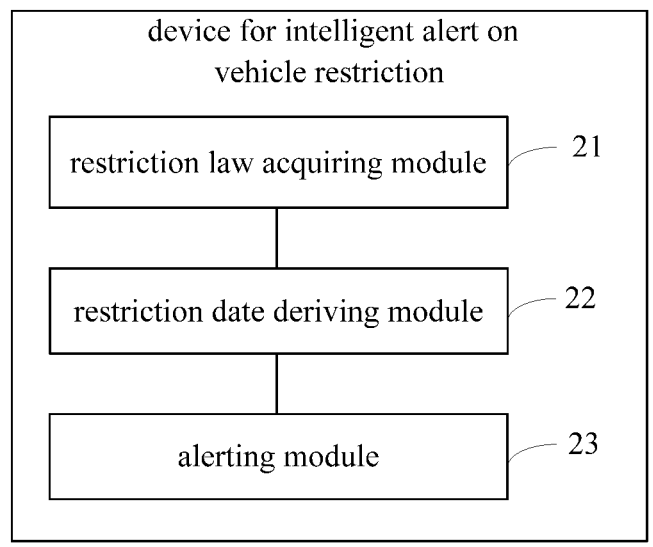
FIG. 10 is a block diagram showing a device for intelligent alert on vehicle restriction, according to an exemplary embodiment of the present disclosure.

As shown in FIG. 10, which is a block diagram showing a device for intelligent alert on vehicle restriction, according to an exemplary embodiment of the present disclosure, the above device may include a restriction pattern acquiring module 21 configured to analyze user behavior data of a user terminal and acquire a user restriction pattern, a restriction date deriving module 22 configured to derive a vehicle restriction date according to the user restriction pattern, an alerting module 23 configured to alert a user to vehicle restriction based on the vehicle restriction date. Specifically, the alerting module 23 may make an alert on vehicle restriction via text, picture, voice or video, etc.

Figure 11:
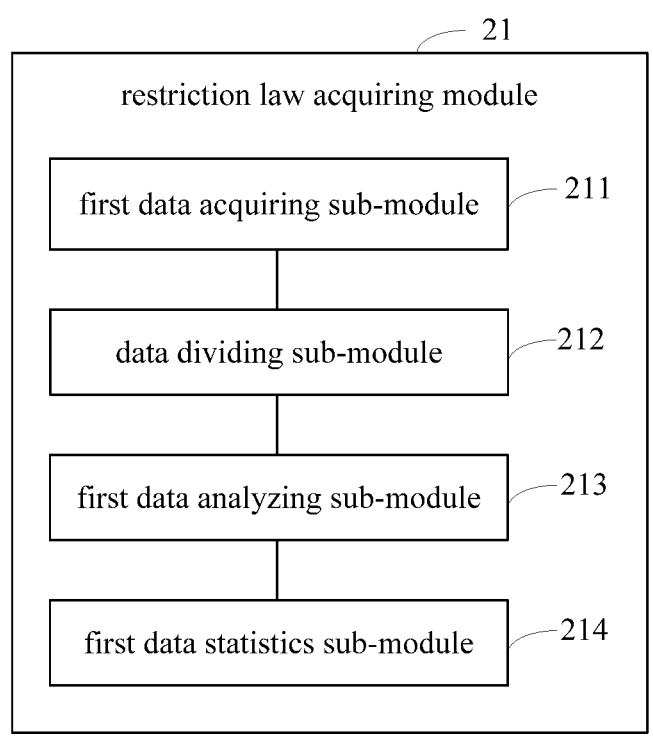
FIG. 11 is a block diagram showing another device for intelligent alert on vehicle restriction, according to an exemplary embodiment of the present disclosure.

FIG. 11 is a block diagram showing a device for providing an intelligent alert on vehicle restriction, according to an exemplary embodiment of the present disclosure. The restriction pattern acquiring module 21 may include the following modules.

A first data acquiring sub-module 211 is configured to acquire user behavior data for a first preset period of time. The preset period of time may include N restriction cycles, for example, N weeks.

A data dividing sub-module 212 is configured to divide, based on the restriction cycles, the user behavior data into N user behavior data units, in each of which, user terminal usage parameters for a same time period on every workday in one restriction cycle are recorded. The restriction cycle may be one week, ten days, fifteen days or one month, etc.

A first data analyzing sub-module 213 is configured to analyze the user behavior data unit and acquire a user restriction day in each restriction cycle. Specifically, the first data analyzing sub-module 213 may be configured to determine as a user restriction day a workday for which a user terminal usage parameter is different from user terminal usage parameters for other workdays in the user behavior data unit. The user terminal usage parameter may be a user terminal usage frequency or the length of time that the user terminal is in connection to a target vehicle Bluetooth as discussed above.

If the user terminal usage parameter is a user terminal usage frequency, the first data analyzing sub-module 213 may be specifically configured to determine as a user restriction day a workday for which a user terminal usage frequency is higher than user terminal usage frequencies for other workdays in the user behavior data unit.

If the user terminal usage parameter is the length of time that the user terminal is in connection to a target vehicle Bluetooth, the first data analyzing sub-module 213 may be specifically configured to determine as a user restriction day a workday for which the length of time that the user terminal is in connection to a target vehicle Bluetooth is zero or significantly smaller than the lengths of time that the user terminal is in connection to a target vehicle Bluetooth for other workdays in the user behavior data unit.

A first data statistics sub-module 214 is configured to statistically analyze user restriction days of the N restriction cycles to acquire a first user restriction pattern.

Figure 12:
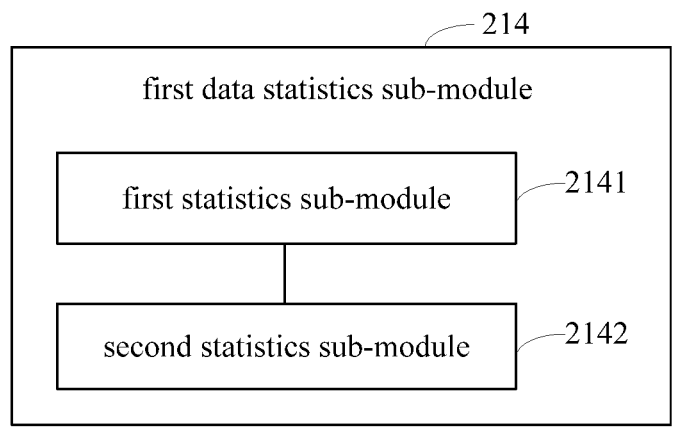
FIG. 12 is a block diagram showing another device for intelligent alert on vehicle restriction, according to an exemplary embodiment of the present disclosure.

Referring to FIG. 12 which is a block diagram showing a device for intelligent alert on vehicle restriction according to an exemplary embodiment, the first data statistics sub-module 214 may include: a first statistics sub-module 2141 configured to make statistics on the N restriction cycles for the preset period of time and acquire a user restriction day corresponding to each restriction cycle, a second statistics sub-module 2142 configured to statistically analyze the user restriction day corresponding to each restriction cycle for the preset period of time and acquire the first user restriction pattern. The first user restriction pattern includes a recent restriction alternating date of the user, a restriction day of the user in the current restriction cycle, and a restriction alternating cycle.

Figure 13:
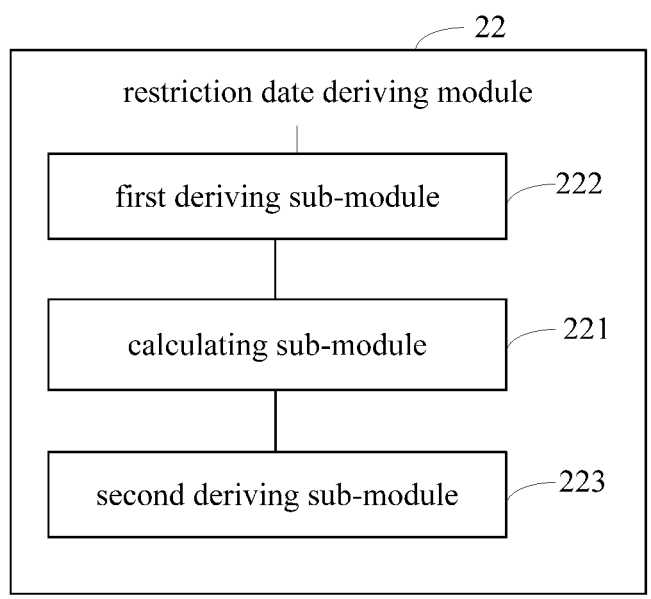
FIG. 13 is a block diagram showing another device for intelligent alert on vehicle restriction, according to an exemplary embodiment of the present disclosure.

Referring to FIG. 13 which is a block diagram showing a device for providing an intelligent alert on vehicle restriction according to an exemplary embodiment, the restriction date deriving module 22 may include: a calculating sub-module 221 configured to add one restriction alternating cycle to the recent restriction alternating date of the user, and acquire a next restriction alternating date of the user, a first deriving sub-module 222 configured to, when the time interval between the user's current date and the user's next restriction alternating date is equal to or larger than one restriction cycle, use a restriction day of the user in the current restriction cycle as a restriction day in the next restriction cycle, a second deriving sub-module 223 configured to, when the time interval between the user's current date and the user's next restriction alternating date is smaller than one restriction cycle, postpone a restriction day of the user in the current restriction cycle by one day and acquire a restriction day in the next restriction cycle.

Figure 14:
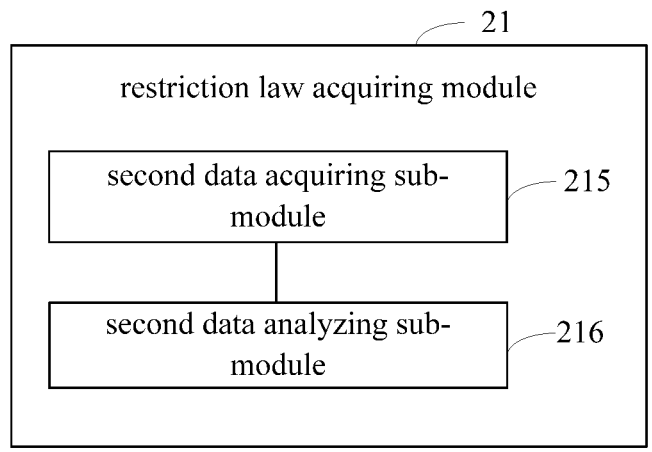
FIG. 14 is a block diagram showing another device for intelligent alert on vehicle restriction, according to an exemplary embodiment of the present disclosure.

Referring to FIG. 14 which is a block diagram showing a device for providing an intelligent alert on vehicle restriction according to an exemplary embodiment, the restriction pattern acquiring module 21 may further include: a second data acquiring sub-module 215 configured to acquire user behavior data for a preset period of time; a second data analyzing sub-module 216 configured to analyze the user behavior data and acquire a second user restriction pattern, the second user restriction pattern including: a restriction cycle, and a user restriction day in each restriction cycle.

Figure 15:
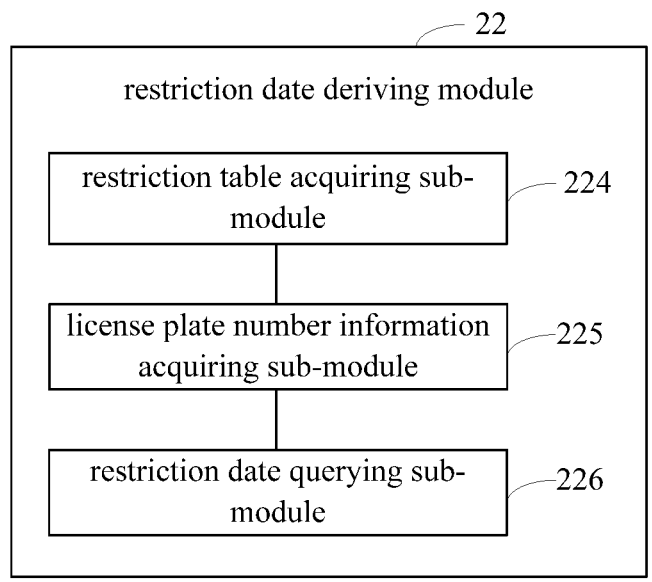
FIG. 15 is a block diagram showing another device for intelligent alert on vehicle restriction, according to an exemplary embodiment of the present disclosure.

Corresponding to FIG. 14, the restriction date deriving module 22 may include the following modules, referring to FIG. 15 which is a block diagram of a device for providing an intelligent alert on vehicle restriction according to an exemplary embodiment.

A restriction table acquiring sub-module 224 is configured to acquire a restriction traffic administrative information table of a place where the user behavior occurs, the restriction traffic administrative information table including correspondence between license plate number information and a restriction day.

A license plate number information acquiring sub-module 225 is configured to query the restriction traffic administrative information table according to the user restriction day and acquire license plate number information of the user's vehicle.

A restriction date querying sub-module 226 is configured to query the restriction traffic administrative information table according to the license plate number information and acquire the vehicle restriction date.

Figure 16:
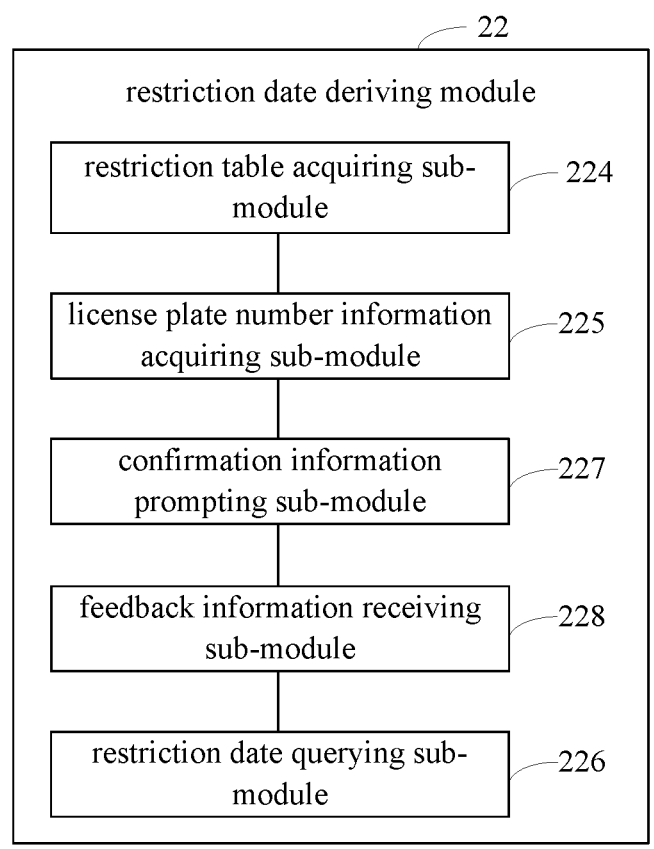
FIG. 16 is a block diagram showing another device for intelligent alert on vehicle restriction, according to an exemplary embodiment of the present disclosure.

Alternatively, referring to FIG. 16 which is a block diagram of a device for intelligent alert on vehicle restriction according to an exemplary embodiment, the restriction date deriving module 22 may further include: a confirmation information prompting sub-module 227 configured to issue prompt information to request confirmation of the license plate number information, a feedback information receiving sub-module 228 configured to provide a user operation entrance in a user interface and receive feedback information of the user on the prompt information.

The way in which the feedback information receiving sub-module 228 provides the user operation entrance in the user interface may include providing the user operation entrance by displaying an operational button in the user interface of the user terminal, or providing the user operation entrance by prompting a voice input in the user interface of the user terminal.

For details of the process to realize functions and roles of respective units in above devices, please refer to the process to realize corresponding steps in above method, which will not be elaborated herein.

Device embodiments basically correspond to method embodiments, so their description may be acquired by referring to description of method embodiments. The device embodiments described as above are merely exemplary, wherein units described as separate components may or may not be physically separated, components displayed as units may or may not be physical units, that is, may be either located at the same place or distributed among a plurality of network units. Some or all modules may be selected according to actual needs to realize the purpose of the solution of the present disclosure. Those ordinary skilled in the art may understand and practice it without paying creative work.

Accordingly, the present disclosure further provides a user terminal, which may include a processor and a memory storing instructions executable by the processor. The processor may be configured to analyze user behavior data of the user terminal and acquire a user restriction pattern; derive a vehicle restriction date according to the user restriction pattern, alert a user to vehicle restriction based on the vehicle restriction date.

Figure 17:
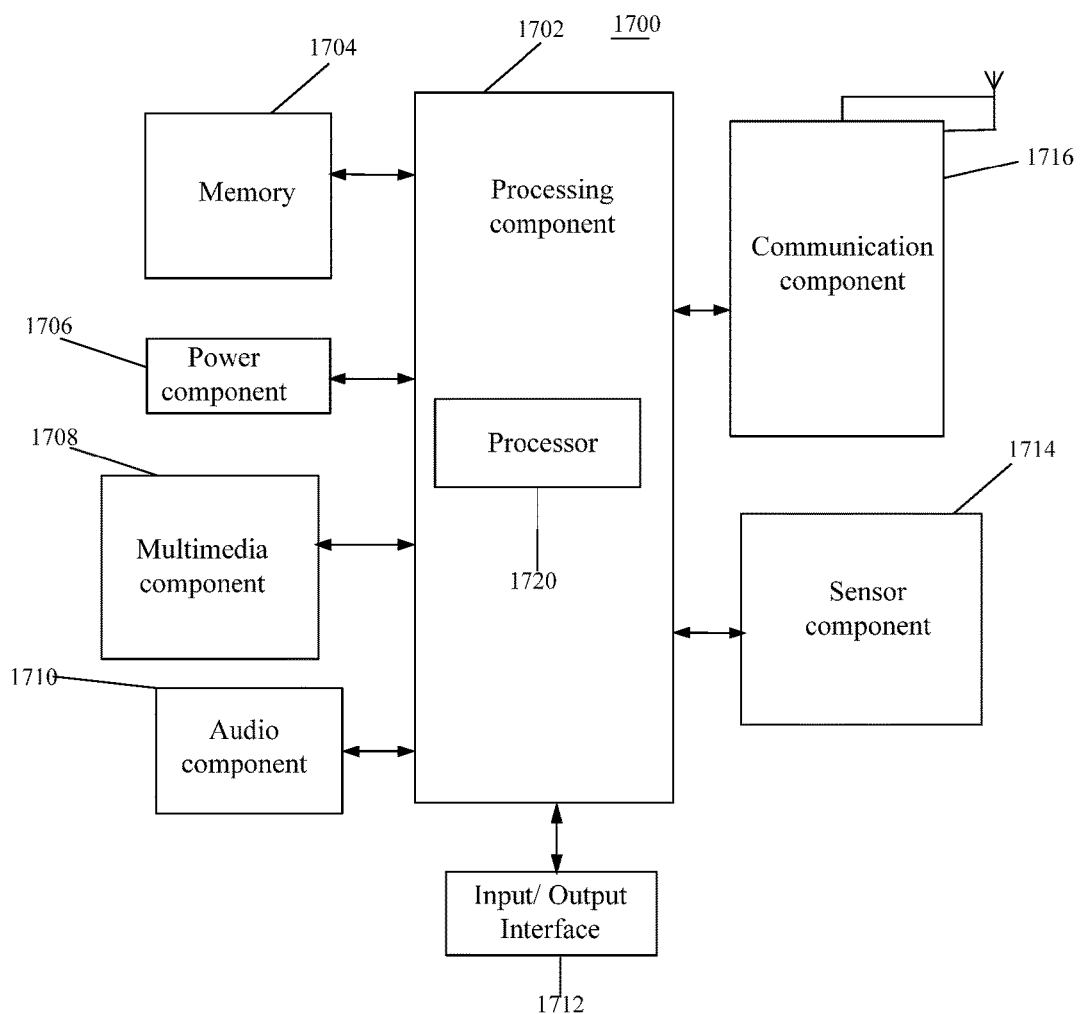
FIG. 17 is a structural schematic diagram showing a device for intelligent alert on vehicle restriction, according to an exemplary embodiment of the present disclosure.

FIG. 17 is a structural schematic diagram showing a device 1700 for intelligent alert on vehicle restriction according to an exemplary embodiment. For example, the device 1700 may be provided as a user terminal.

Referring to FIG. 17, the device 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the device 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the device 1700. Examples of such data include instructions for any applications or methods operated on the device 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the device 1700. The power component 1706 may include a power management system, one or more power sources, and any other components associated with the generation, management, and distribution of power in the device 1700.

The multimedia component 1708 includes a screen providing an output interface between the device 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. The front camera and the rear camera may receive an external multimedia datum while the device 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone ("MIC") configured to receive an external audio signal when the device 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the device 1700. For instance, the sensor component 1714 may detect an open/closed status of the device 1700, relative positioning of components, e.g., the display and the keypad, of the device 1700, a change in position of the device 1700 or a component of the device 1700, a presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the device 1700 and other devices. The device 1700 can access a wireless network based on a communication standard, such as WiFi, 2G, or 3G, or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies Each module, such as those discussed with respect to FIGS. 10 through 16, may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for providing alert information on a vehicle, comprising:
analyzing user behavior data of a certain period of time in association with a user terminal to obtain vehicle restriction dates during the certain period of time, wherein the analyzing comprises dividing the user behavior data into N user behavior data units corresponding to N cycles included in the certain period of time, and determining a vehicle restriction date for each of the N cycles based on each of the N user behavior data units;
determining a vehicle restriction pattern based on the vehicle restriction dates;
determining a new vehicle restriction date based on the vehicle restriction pattern, wherein determining the new vehicle restriction date comprises adding one restriction changing cycle to a recent restriction date of the user and acquiring a next restriction changing date of the user,
wherein when a time interval between the user's current date and the user's next restriction changing date is equal to or larger than one restriction cycle, using a restriction day of the user in a current restriction cycle as a restriction day in a next restriction cycle,
and wherein when the time interval between the user's current date and the user's next restriction changing date is smaller than one restriction cycle, using a next day of the restriction day of the user in the current restriction cycle as the restriction day in the next restriction cycle; and
providing the alert information on the vehicle to the user terminal based on the new vehicle restriction date.

2. The method of claim 1, wherein determining a vehicle restriction date for each of the N cycles based on each of the N user behavior data units comprises:
extracting a user terminal usage parameter for a workday in the each cycle from the user behavior data units; and
determining a vehicle restriction day based on comparison of user terminal usage parameters for workdays in the each cycle.

3. The method of claim 2, wherein the user terminal usage parameter comprises a terminal operation frequency during a certain time of the workday.

4. The method of claim 2, wherein the user terminal usage parameter comprises a length of time that the user terminal is connected with the vehicle via a wireless communication link during a certain time of the workday.

5. The method of claim 1, wherein each of the N cycles is one week.

6. The method of claim 3, wherein the terminal operation frequency comprises a number of a screen of the user terminal being turned on.

7. The method of claim 3, wherein the terminal operation frequency comprises a number of access requests made to the internet by the user terminal.

8. The method of claim 2, wherein the user terminal usage parameter comprises a number of text messages sent during a certain time of the workday.

9. The method of claim 1, wherein providing the alert information on vehicle restriction to the user terminal based on the new vehicle restriction date comprises:
displaying the alert information on the user terminal when the user terminal is connected with the vehicle on the new vehicle restriction date.

10. The method of claim 1, wherein providing the alert information on the vehicle to the user terminal based on the new vehicle restriction date comprises:
displaying a message requesting confirmation of a last digit of a license plate number for the vehicle.

11. The method of claim 1, wherein providing the alert information on the vehicle to the user terminal based on the new vehicle restriction date comprises providing the alert information on the vehicle via text, picture, voice or video.

12. A device for providing alert information on a vehicle, comprising:
a processor; and
a memory storing instructions executable by the processor,
wherein the processor is configured to:
analyze user behavior data of a certain period of time in association with a user terminal to obtain vehicle restriction dates during the certain period of time by dividing the user behavior data into N user behavior data units corresponding to N cycles included in the certain period of time, and determining a vehicle restriction date for each of the N cycles based on each of the N user behavior data units;

determine a vehicle restriction pattern based on the vehicle restriction dates;

determine a new vehicle restriction date based on the vehicle restriction pattern by adding one restriction changing cycle to a recent restriction date of the user and acquiring a next restriction changing date of the user, using a restriction day of the user in a current restriction cycle as a restriction day in a next restriction cycle when a time interval between the user's current date and the user's next restriction changing date is equal to or larger than one restriction cycle, and using a next day of the restriction day of the user in the current restriction cycle as the restriction day in the next restriction cycle when the time interval between the user's current date and the user's next restriction changing date is smaller than one restriction cycle; and provide the alert information on the vehicle to the user terminal based on the new vehicle restriction date.

13. The device of claim 12, wherein the processor is configured to:

extract a user terminal usage parameter for each day of the certain period of time; and determine vehicle restriction dates based on comparison of user terminal usage parameters for days of the certain period of time.

14. The device of claim 13, wherein the user terminal usage parameter comprises a terminal operation frequency during a certain time of the workday.

15. The device of claim 13, wherein the user terminal usage parameter comprises a length of time that the user terminal is connected with the vehicle via a wireless communication link during a certain time of the workday.

16. The device of claim 14, wherein the terminal operation frequency comprises the number of a screen of the user terminal being turned on.

17. The device of claim 14, wherein terminal operation frequency comprises the number of requesting access to the internet by the user terminal.

18. The device of claim 12, wherein the processor is further configured to send an instruction for displaying the alert information on the user terminal when the user terminal is connected with the vehicle on the new vehicle restriction date.

19. A non-transitory computer readable medium comprising instructions for providing alert information regarding a vehicle to a user of a device, wherein the instructions, when executed by a processor in the device, cause the device to:

analyze user behavior data of a certain period of time in association with a user terminal to obtain vehicle restriction dates during a certain period of time by dividing the user behavior data into N user behavior data units corresponding to N cycles included in the certain period of time, and determining a vehicle restriction date for each of the N cycles based on each of the N user behavior data units;

determine a vehicle restriction pattern based on the vehicle restriction dates;

determine a new vehicle restriction date based on the vehicle restriction pattern by adding one restriction changing cycle to a recent restriction date of the user and acquiring a next restriction changing date of the user, using a restriction day of the user in a current restriction cycle as a restriction day in a next restriction cycle when a time interval between the user's current date and the user's next restriction changing date is equal to or larger than one restriction cycle, and using a next day of the restriction day of the user in the current restriction cycle as the restriction day in the next restriction cycle when the time interval between the user's current date and the user's next restriction changing date is smaller than one restriction cycle; and provide the alert information on the vehicle to the user terminal based on the new vehicle restriction date.

* * * * *